Sept. 8, 1931.  A. M. DUCEY  1,822,084
SIGN
Filed July 31, 1929
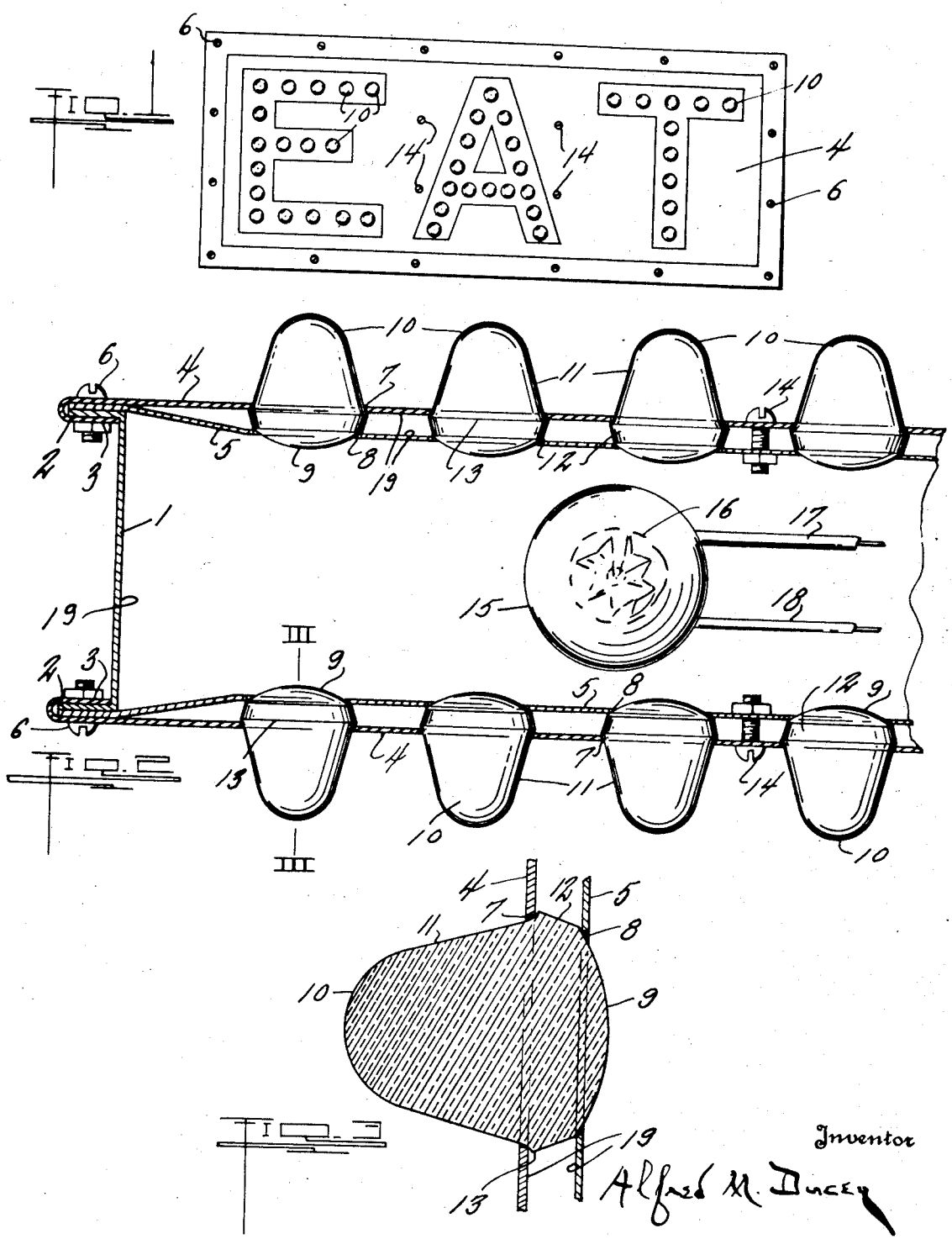

Patented Sept. 8, 1931

1,822,084

UNITED STATES PATENT OFFICE

ALFRED M. DUCEY, OF TOLEDO, OHIO, ASSIGNOR TO KADOW FOUNDATION, INC., OF TOLEDO, OHIO, A CORPORATION OF DELAWARE

SIGN

Application filed July 31, 1929. Serial No. 382,313.

This invention relates to luminous displays.

This invention has utility in advertising signs.

Referring to the drawings:

Fig. 1 is a front view of a sign embodying the invention herein;

Fig. 2 is a fragmentary section through the sign of Fig. 1, on an enlarged scale; and Fig. 3 is a section on the line III—III, Fig. 2.

The sign as herein disclosed is shown as embodying frame 1 having outwardly extending flanges 2 being embraced by inwardly extending flanges 3 from outer plates 4 opposing inner plates 5. These plates 4, 5, are assembled by bolts 6 with the main frame or intermediate portion 1. The plates 4, 5, are of flexible material and have outer major seats or openings 7 registering with inner seats or openings 8. In these recesses are disposed double convex lenses herein shown as having major spherical lens portion 9 and symmetrically disposed minor convex lens portion 10 with intermediate tapering portions 11, 12, forming an enlargement 13.

The plates 4, 5, coact for anchoring these double convex lenses by having the seats 7 coact with the tapered region 11 from the spherical lens portion 10 in the vicinity of the enlargement 13. From this major seat 7 the lens inwardly extends to have minor seat 8 engage the spherical lens portion 9 close to the merging portion of this lens portion 9 with the lens portion 12. As thus assembled, bolts 14 may flex the inner plate 5 toward the outer plate 4 in thus providing lens holding anchoring for these double convex lenses thus mounted in the housing provided by the plates 4, 5, and the base 1.

A source of illumination as incandescent bulb 15 is in socket 16 having electric current supply lines 17, 18, thereto. The inner walls of the plate 5 and the base 1 may have light reflective inner coating 19 thereon for increasing the dispersion effect from the electric light bulb 15 in thus approximating a uniform luminosity for the various elements of these lenses as assembled in this group for a sign. The sign is one having long range of visibility which is attractive in appearance even in day time.

What is claimed and it is desired to secure by Letters Patent is:

1. The combination with a plurality of double convex lenses having intermediate enlargements and different lens center common axes perpendicular to said enlargements, of a mounting base comprising a pair of plates having lens seats providing openings in the outer plate for lens protuberance and registering openings in the inner plate for lens protuberance to a different extent, and means for anchoring said lenses for mounting said axes in parallelism, said means being effective for flexing one plate toward the other in this lens holding position.

2. The combination with a plurality of double convex spherical lenses having different radii for the convex portions of the lenses and converging tapering regions between the convex portions to provide an enlargement adjacent the inner longer convex portion and different lens center common axes perpendicular to said enlargements, of a two ply mounting for locating in parallelism the axes of the lenses comprising sheets peripherally in proximity and having registering seats spaced by said enlargements for flaring one of the sheets as to the other.

3. The combination with a plurality of double convex spherical lenses having different radii for the convex portions of the lenses and converging tapering regions between the convex portions to provide enlargements adjacent the inner longer convex portions and different lens center common axes perpendicular to said enlargements, of a two ply mounting for locating in parallelism the axes of the lenses comprising a pair of plates peripherally abutting, there being seat-providing openings in the outer plate of larger diameter for engaging the tapering region from the lesser radius portion of the lenses for lens outward protuberance, and registering seats of lesser diameter for engaging adjacent the tapering region from the larger radius portions for lens protuberance a less extent inwardly than outwardly.

In witness whereof I affix my signature.

ALFRED M. DUCEY.